H. W. LEONARD.
ELECTRICALLY PROPELLED VEHICLE.
APPLICATION FILED APR. 13, 1908.

1,042,698.

Patented Oct. 29, 1912.
4 SHEETS—SHEET 1.

Fig. 1

Witnesses
Geo. O. Hoffman.
Geo. N. Kerr.

H. Ward Leonard Inventor
By his Attorneys
Edwards, Sager & Wooster.

H. W. LEONARD.
ELECTRICALLY PROPELLED VEHICLE.
APPLICATION FILED APR. 13, 1908.

1,042,698.

Patented Oct. 29, 1912.

H. W. LEONARD.
ELECTRICALLY PROPELLED VEHICLE.
APPLICATION FILED APR. 13, 1908.

1,042,698.

Patented Oct. 29, 1912.

Witnesses
Geo. A. Hoffman
Geo. N. Kerr

H. Ward Leonard, Inventor
By his Attorneys
Edwards, Sager & Wooster

H. W. LEONARD.
ELECTRICALLY PROPELLED VEHICLE.
APPLICATION FILED APR. 13, 1908.

1,042,698.

Patented Oct. 29, 1912.
4 SHEETS—SHEET 4.

Fig. 5

UNITED STATES PATENT OFFICE.

HARRY WARD LEONARD, OF BRONXVILLE, NEW YORK.

ELECTRICALLY-PROPELLED VEHICLE.

1,042,698.  Specification of Letters Patent.  Patented Oct. 29, 1912.

Original application filed March 2, 1903, Serial No. 145,686. Renewed May 26, 1908, Serial No. 435,119.
Divided and this application filed April 13, 1908. Serial No. 426,638.

*To all whom it may concern:*

Be it known that I, HARRY WARD LEONARD, a citizen of United States, residing at Bronxville, in the county of Westchester and State of New York, have invented certain new and useful Improvements in Electrically-Propelled Vehicles, of which the following is a full, clear, and exact specification.
This application is a division of my pending application Serial No. 145,686, filed March 2, 1903, renewed May 26, 1908, Serial No. 435,119.

My invention relates to various devices and more especially to that class of vehicles in which an engine is employed for driving a dynamo electric machine which supplies energy to one or more propelling electric motors.
The principal object of my invention when applied to vehicles is to secure more perfect control of the speed and tractive effort over a wide range desirable in order to secure the best results in practice.
Further objects of my invention are the reduction of wear, breakage, noise, strain and shock present in apparatus of this general character as heretofore proposed; the utilization of the simplest, cheapest and best form of prime mover under conditions most favorable for its use; and the use of electric motors for propelling the vehicle under conditions most favorable to their efficiency and durability.
The principal features of my invention when applied to vehicles may be briefly stated as follows: I develop upon the vehicle itself by means of a prime mover, such as a gasolene engine, the power employed in the propulsion of the vehicle, and this power is transformed into electric energy, the electromotive force of which is controllable over a wide range at the will of the operator. This electric energy is supplied to one or more propelling motors at such a voltage and current as will cause the vehicle to travel at the speed desired according to the road surfaces and grades met with. In practice the electrical transmission as I em-
ploy it replaces the usual mechanical variable or change speed gear, although in some instances I may employ such a gear in addition to the electrical control or electrical transmission gear as it may be termed.

Certain forms of my invention are illustrated in the accompanying drawings, in which—

Figure 1:
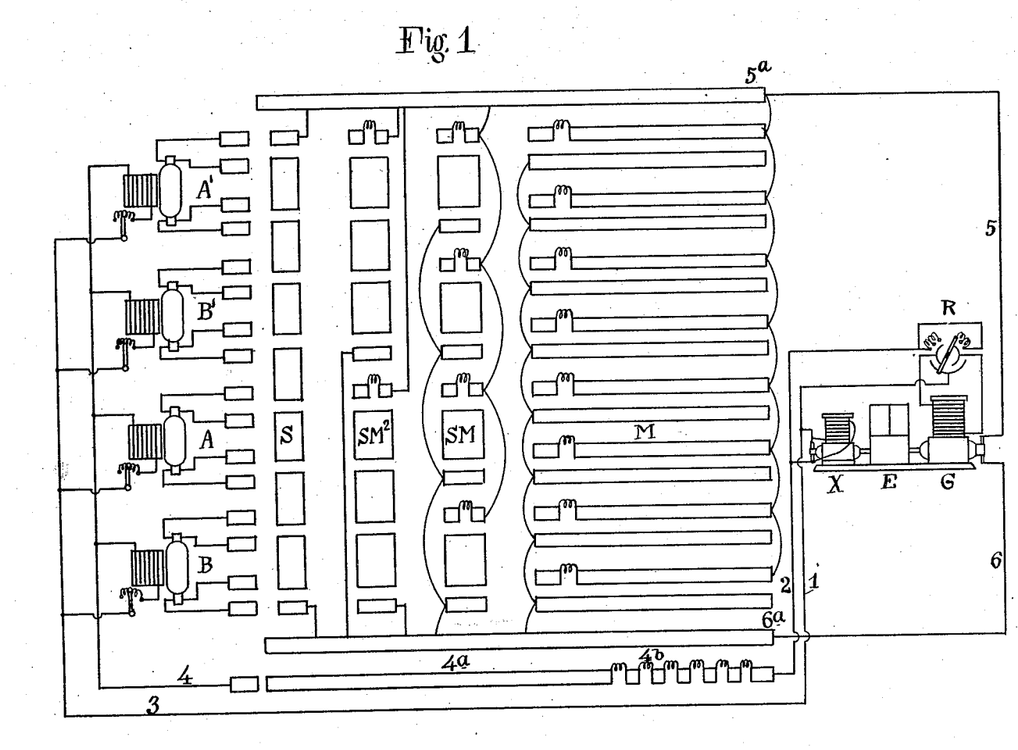
Figure 1 is a diagrammatic view of a series parallel controller for a truck employing four propelling motors and embodying certain features of my invention.

In Fig. 1, I have illustrated four propelling motors A, B, A', B' provided with double wound armatures, the two windings being on the same core and having each of the armature windings connected independently to its respective commutator. The field windings of these motors are connected in multiple arc relation across circuit 3, 4 with a resistance in series with each winding for the purpose of adjusting the fields relatively to each other. Circuit 3, 4 is connected across circuit 1, 2 extending from exciter X, conductor 4 being attached to a stationary contact adapted to make contact with plates 4$^a$, and 4$^b$, which are connected with conductor 2. The field winding of generator G is connected across circuit 1, 2 through reversing rheostats R. E represents a two cylinder gasolene engine for driving the machines X and G. The armature circuit 5, 6 from generator G is connected with brushes or other suitable contacts engaging plates 5ᵃ and 6ᵃ, and between these plates are connected a series of moving contacts M, SM, SM², and S, with which the stationary contacts to which the armature windings of the motors are connected, make contact. With the four sets of contacts arranged as shown, the eight armature windings will be connected in multiple arc relation when the stationary contacts are on plates M; when on plates SM the two windings of each armature will be in series and the four armatures in multiple arc relation; when on plates SM² the windings will be in two series of four each, that is, the windings of the two forward armatures will be in series and the windings of the two rear armatures will be in series, the two series being connected across the line in multiple arc relation; and when the stationary contacts are on plates S, the eight armature windings will be in series across the line. In this diagram I have shown the intermediate steps supplied with resistances so as to pass smoothly from one arrangement of the armature winding to the next. The arrangement of windings and connections illustrated gives four torques in the ratios of one, two, four and eight, with a certain number of amperes generated by machine G and constant motor fields. When the windings of the motor armatures are all in multiple the motor fields may be weakened by resistances 4ᵇ to obtain a still further range of speed. The electromotive force of the generator can be varied from zero to its maximum electromotive force in either sense to vary the energy supplied to the armatures of the propelling motors, and the fields of the propelling motors can also be varied, so as to secure the widest possible range in speed and torque. It will be understood that the speed of the vehicle is gradually increased by movement of the controlling switch shown in Fig. 1 to the left, giving first the full series connection of the armature windings, then successive series multiple connections, then the full multiple connections of the motor armature windings and then further increase in speed by weakening the fields of the motors by the insertion of resistances 4ᵇ in the field circuit of the motor field windings, and that a gradual decrease in speed is obtained by the reverse movement of the controlling switch.

Figure 2:
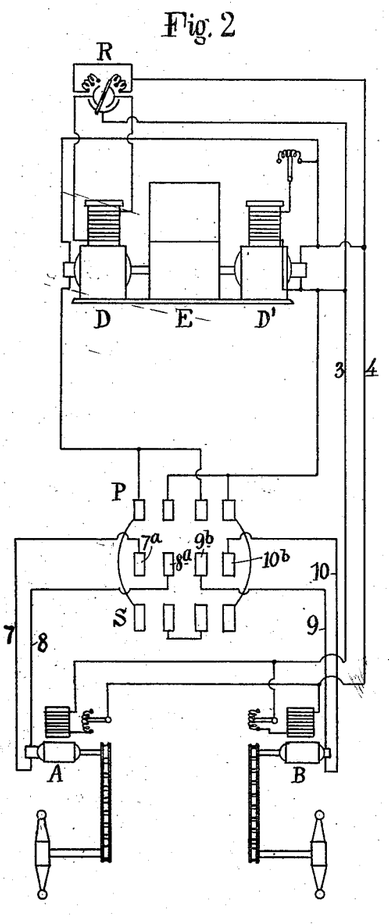
Fig. 2 is a diagrammatic view of an arrangement in which a counter electromotive force system of regulation is employed for the dynamo electric machines supplying energy to the propelling motors, and a series parallel method of control for the armatures of the propelling motors.

In Fig. 2, wherein I illustrate the counter electromotive force method of control, A and B represent the propelling motors geared to the rear traction wheels, E represents a two cylinder gasolene engine and D, D′ represent two dynamo electric machines driven by said engine. The field windings of the driven motors are connected in multiple arc relation across the circuit 3, 4, which circuit is connected across the armature terminals of machine D′ and are of constant strength, but variable at the will of the operator. Machine D′ has a shunt field winding, and machine D has its field winding connected across the armature terminals of machine D′ through a regulating reversing rheostat R. The armature of machines D and D′ are connected in series to the stationary contacts of a series parallel controller SP, and the armature circuit 7, 8 and 9, 10 of the propelling motors are connected to switch blades 7ᵃ, 8ᵃ, 9ᵇ and 10ᵇ respectively. It is well understood that the energy supplied to the armatures of the working motors through the agency of machines D and D′ can be varied at will from zero to the combined electromotive force of both machines by adjusting the fields of machine D so that it will either oppose or assist the electromotive force of machine D′. This arrangement in itself would give a very wide range of speed for the propelling motors, but by the addition of the series parallel controller as in the arrangement of Fig. 1 of my original application, the number of successive variations in speed or torque can be still further increased.

Figure 3:
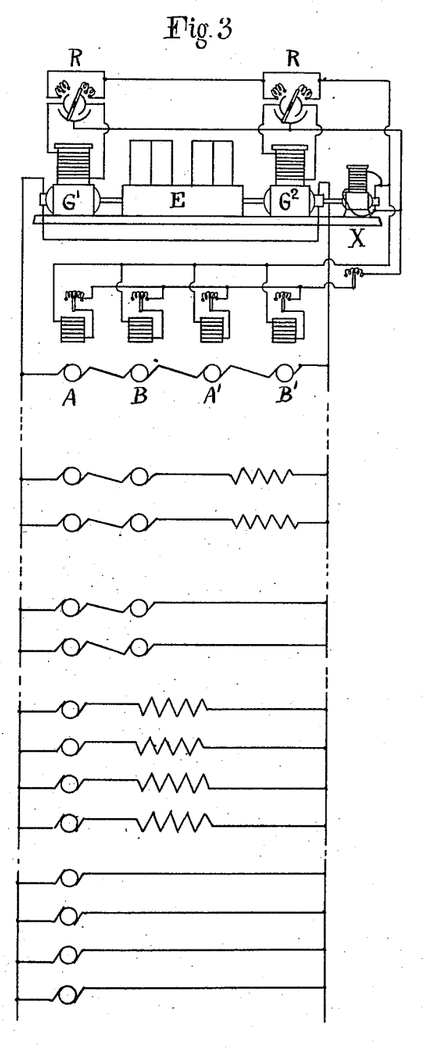
Fig. 3 is a diagram of a modified system of motor control, the extension indicating the connections established by means of a series parallel controller.

In Fig. 3, I have illustrated a system in which E represents a four cylinder gasolene engine and G′ and G² dynamo electric machines driven by said engine, and X an exciter also driven by said engine. The field windings of the two machines G′, G² are connected in parallel across the armature terminals of exciter X, a reversing rheostat R being connected in each field circuit. A, B, A′ and B′ represent the propelling motors, the field windings of which are connected in parallel across the armature terminals of exciter X. The armatures of these machines will be controlled by a series parallel controller, similar to that illustrated in Fig. 1, and to illustrate the several connections, the circuit from generators G′, G² is extended in sections. In this arrangement, the armatures of machines G′ and G² are connected in series and the successive connections of the motor armatures are illustrated in five combinations, viz., four armatures in series; two armatures in series in each group with a resistance in series with each group; two armatures in series in two groups without resistance; four armatures in parallel with a resistance in series in each; and four armatures in parallel without resistance. The energy supplied to the armatures of the propelling motors can be varied from zero to a maximum in either direction by adjusting the reversing rheostats R relatively to each other. A rheostat is inserted in the field circuit of each motor for adjusting the fields relatively to each other, and another rheostat is connected in circuit leading to those fields from exciter X for the purpose of regulating all the motor fields simultaneously and similarly. A controller for securing the connections of the motor armatures as above refererd to, and for securing the weakening of the motor field for high speeds is shown in development in Fig. 6, which is the same as that illustrated in Fig. 1, except that only half of the controller development of Fig. 1 is included, because only four armature windings are controlled instead of eight.

Figure 4:
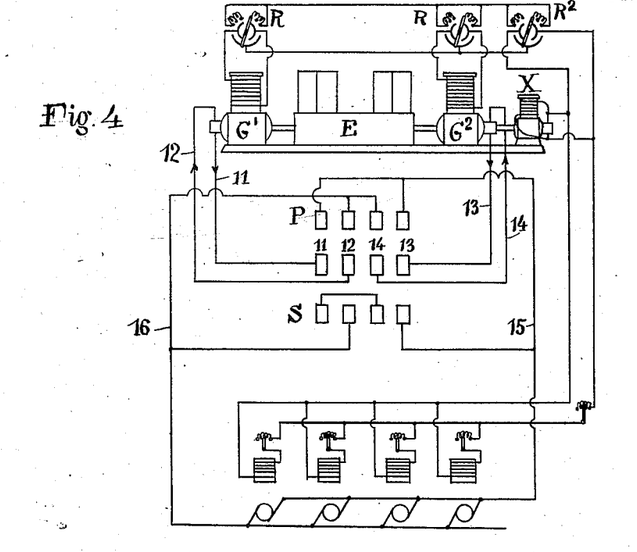
Fig. 4 illustrates a modification of the system of Fig. 3, a series parallel switch being provided for placing the generator armatures in series or in multiple.

In Fig. 4, I have illustrated a modification of the system of Fig. 3, but have not carried out the various connections for the armatures of the propelling motors, it being understood however, that the armatures may be connected up in the same or similar successive steps by means of a controller of the form illustrated in Fig. 1. In Fig. 4, I have shown an additional reversing rheostat $R^2$ in the field circuit of machines $G'$ and $G^2$, whereby the fields when desired may be adjusted similarly and simultaneously. In this figure, I have also shown a series parallel switch SP in the armature circuit of $G'$ and $G^2$, whereby the armatures of the said machines may be connected in series or in parallel to supply energy to the armatures of the working motors. The armature circuit 11, 12 of machine $G'$ is connected to the movable switch blades 11, 12 and the armature circuit 13, 14 of machine $G^2$ is connected to movable switch blades 13, 14. The armature circuit 15, 16 for the working motors is connected in two branches with stationary contacts SP. It will be observed that when the movable contacts are brought into engagement the stationary contacts S, the circuit connections will be as follows: from armature $G'$ by conductor 11 to the first contact S, from that contact to the third contact S, to movable contact 14 and conductor 14 to the armature of machine $G^2$ and from that armature by conductor 13 to movable contact 13 and the fourth stationary contact S and from that contact to conductor 15 to the armatures of the working motors and from the working motors by conductor 16 to the secondary stationary contact S and from that contact by movable contact 12 and conductor 12 back to the armature of machine $G'$. When the movable switch blades are moved into contact with stationary contacts P the two armatures will act in parallel; the circuit from machine $G'$ being by the way of conductor 11, blade 11, first contact P and conductor 15 to the motor armatures and from the motor armatures by conductor 16 to the second stationary contact P and by blade 12 and conductor 12 back to the armature of machine $G'$; the circuit from the armature of machine $G^2$ will be by conductor and blade 13 to the fourth stationary contact P and by conductor 15 to the motor armatures and from the motor armatures by conductor 16 to the third stationary contact P and by blade and conductor 14 back to the armature $G^2$.

In the arrangement of Fig. 4, as in the arrangement of Fig. 3, it will be observed that by manipulating the reversing field rheostat of machines $G'$ and $G^2$ there can be obtained from these machines an electromotive force which will vary from zero to the combined electromotive forces of both machines, and in either sense. The reversing rheostat $R^2$ may be employed when the armatures of machine $G'$ and $G^2$ are connected in multiple or in series so that when varying the energy supplied by those machines, by varying their fields simultaneously and to the same extent, they will divide equally the total load.

With the arrangement of Fig. 4 applied to a truck and when working on heaviest duty, as for instance on the worst grades met with, the armatures of machines $G'$ and $G^2$ will be connected in multiple and the armatures of the four propelling motors will be connected in series. For obtaining the maximum speed on a level, the armatures of machines $G'$ $G^2$ will be connected in series and the armatures of the four propelling motors will be connected in multiple. The relative values of these connections will be as follows, assuming that the energy developed in each of the machines $G'$ and $G^2$ is 100 volts and 50 amperes, and assuming also that the capacity of each of the working motors with full fields is 200 volts and 100 amperes: For maximum torque we will have a torque due to 100 amperes $\times 4 = 400$ and the corresponding speed would be $$\frac{100 \text{ volts}}{4} = 25.$$

For maximum speed on a level we will have a speed due to 200 volts on each motor armature, and hence the speed will be 8 times as much as in the first instance and the torque will be that due to 50 amperes, that is, the torque will be $\frac{1}{8}$ of the maximum torque. By weakening the fields of the propelling motors the speed can be still further increased 25% or more with a corresponding reduction of torque for the same amperes. In many instances a truck provided with two generators and two motors with one exciter will give sufficiently good results. Such a combination will give for heaviest grades a maximum torque (generators in multiple) due to 50 amperes + 50 amperes = 100 A. $\times 2$ motors in series = 200 and a corresponding speed due to two motors in series across 100 volts=50. This combination on a level will give a maximum speed (without varying motor fields) due to 100 volts+100 volts=200 and a corresponding torque due to $$\frac{50 \text{ amperes}}{2}$$

in each armature, and two armatures in multiple gives a torque due to 50 amperes. This last arrangement will give an electrical gear having a reduction of 4 to 1 and by weakening the motor fields the reduction can be made 5 to 1 or 6 to 1. With the arrangement illustrated in Fig. 4 we can obtain a reduction of 8 to 1 without varying the motor fields and by motor field regulation we can obtain an electrical gearing having a reduction variable from 1 to 10 with a speed variable from 10 to 1.

Figure 5:
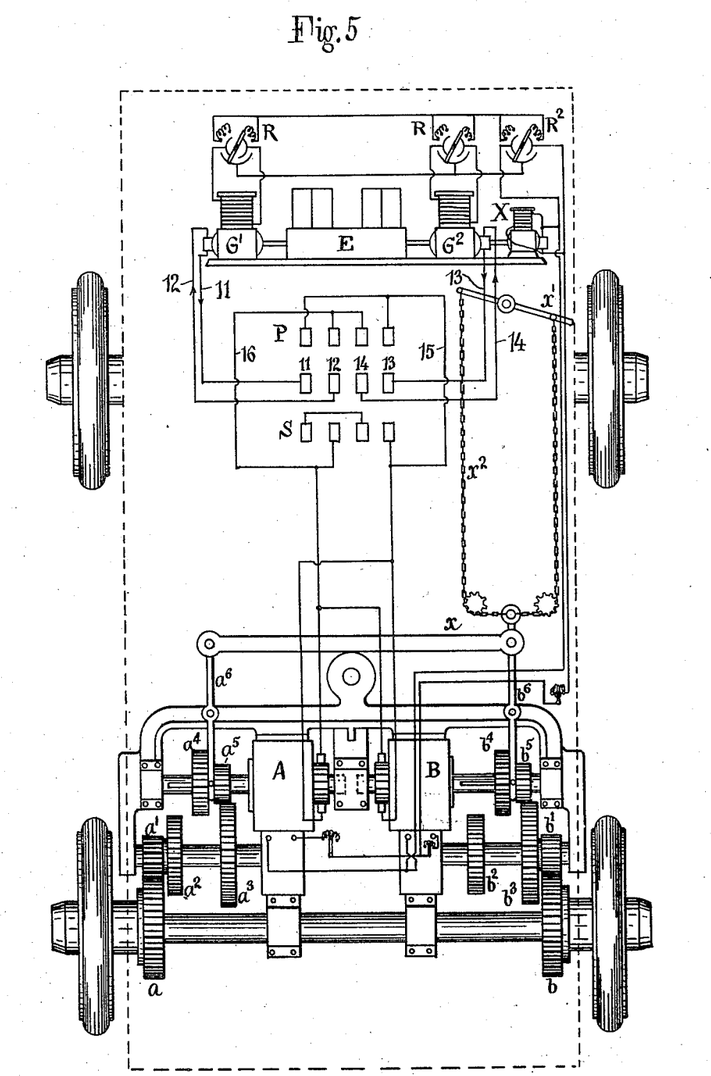
Fig. 5 is a diagrammatic illustration of a motor truck employing certain features of my invention.

In Fig. 5, I have indicated in diagram a motor truck embodying certain features of my invention and having applied thereto the controlling apparatus of Fig. 4, two propelling motors being indicated instead of four. The rear traction wheels are journaled on separate short shafts, and each wheel is driven by separate electric motors A and B through double reduction gears. The motors are spring suspended at one end in any suitable and well known manner, and the vehicle axle passes through the other end of each motor as is common in modern street railway motor suspension.

The double reduction gear comprises gear wheel $a$ which is keyed to the shaft of its respective traction wheel, a pinion $a'$ meshing therewith, a gear wheel $a^2$, a gear wheel $a^3$ of larger diameter than wheel $a^2$, said pinion and the gear wheels $a^2$ and $a^3$ being keyed on a counter shaft, and pinions $a^4$ and $a^5$ splined on the armature shaft of motor A, the latter pinion being of smaller diameter than the pinion $a^4$, and said two pinions being arranged to slide on the shaft so as to place one or the other in mesh with its respective gear wheel $a^2$ or $a^3$. The reduction gear for motor B is exactly the same, and corresponding wheels and pinions are marked $b$ to $b^5$. As illustrated in Fig. 5, pinions $a^5$ and $b^5$ are in mesh with gear wheels $a^3$ and $b^3$, respectively, which is the lowest speed connection, and when the pinions on the motor shafts are shifted simultaneously pinions $a^4$ and $b^4$ are brought into mesh with gear wheels $a^2$ and $b^2$ respectively, which connection gives the second or higher speed. The pinions on the motor shaft may be shifted simultaneously in any suitable manner, and for the purpose of illustration I have shown two pivoted levers $a^6$ and $b^6$ which engage collars on the pinions, and said levers being connected by a rod $x$ so as to shift in unison. These levers are connected to a shifting or controller lever $x'$ within reach of the operator by means of a rod or chain $x^2$. At the forward end of the truck is located preferably a two cylinder gasolene engine E which drives generators $G'$ $G^2$. These generators supply the energy for the armatures of the propelling motors, and the engine also drives an exciter X of constant electromotive force which energizes the fields of the propelling motors and the generators.

The electrical controlling apparatus and circuit connections shown in Fig. 5 are as above stated the same as shown in Fig. 4, except only two motors are shown, and the apparatus and circuits are designated by the same reference characters as in Fig. 4. With the apparatus illustrated in Fig. 5, it will be seen that two speeds can be obtained in either direction by manipulating the series parallel switch SP for securing series parallel operation of the generators, and by manipulating the gearing between the motor shafts and the traction wheels, two additional speeds may be obtained, as will be apparent. Additional speeds may be obtained by adjusting the rheostats R, R and $R^2$ as above described in connection with Fig. 4, and for each position of the electrical controlling apparatus an additional speed may be obtained by shifting the gears at the motors.

Figure 6:
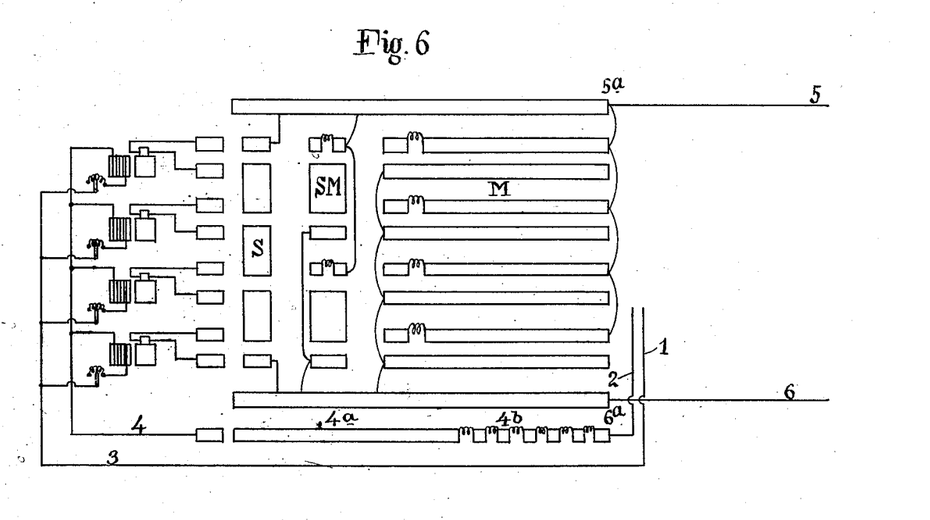
Fig. 6 is a diagram of a controller for securing the change of connections indicated in Fig. 3.

Fig. 6 is a diagram of a controller for securing the connection indicated in Fig. 3, the development of the controller diagram being similar to that of Fig. 1, except four motors each with single armature windings are controlled as in Fig. 3, instead of four motors each with double windings as in Fig. 1.

It will be seen that if the electromotive force of the generator, or generators supplying energy to the circuit, is lower than that of the opposing electromotive forces in the circuit, as may be the case in going down grades or in retarding the machine, the armature of the generator will be driven as a motor and act to retard or limit the speed of the vehicle to any desired amount. I may therefore cause the vehicle to be retarded by lowering the electromotive force of the generator by weakening its field as by means of the rheostat; the motors will then act as generators and supply energy to the generator which now acts as a motor. Since the vehicle when going down grade can be reversed and caused to back up the grade, it will be apparent that by placing the controlling rheostat at a proper position, a current can be passed from the generator through the motors which will tend to move the vehicle backward up the grade but will be just sufficient to balance the tendency of the vehicle to move down the grade by virtue of its weight. My invention therefore affords a simple arrangement for holding the vehicle stationary when either going up a grade or going down a grade and without the necessity of using brakes.

While I have shown separate dynamo electric generators and dynamo electric motors as the means for transmitting electrically the energy of the prime mover to the wheels, it will be understood that my invention is not limited to such means but may cover any suitable means for electrically transmitting the power of the prime mover to the driven device or devices.

While I have shown and described certain forms of my invention, it will be understood that the scope of my invention is not confined thereto, and that I am limited only as indicated in the following claims.

Having thus described my invention, I declare that what I claim as new and desire to secure by Letters Patent, is,—

1. The combination of a plurality of electromotive force supplying devices, a plurality of electromotive force receiving devices, and means for connecting said supplying devices in series and in parallel with each other and for connecting said receiving devices in series and in parallel with each other and for varying the electromotive force supplied by one of said supplying devices independently of that of the other.

2. The combination of a plurality of windings each adapted to supply a variable electromotive force produced by magnetic induction, a plurality of motor windings acting on a common load, and means for connecting said first named windings in series and in parallel to supply energy to said motor windings, for varying the electromotive force of one of said first named windings independently of that of the other and for connecting said motor windings in series and in parallel.

3. The combination of a plurality of motor windings, a plurality of variable voltage devices for supplying energy thereto, each of said devices comprising an electromotive force producing winding revolving in a magnetic field, and means for connecting said devices in series and in parallel, for varying the electromotive force of one of said devices independently of that of the other and for connecting said motor windings in series and in parallel.

4. The combination of a plurality of motor windings working on a common load, a plurality of sources of electromotive force, and means for supplying energy to each of said motor windings from each of said sources, and for varying the electromotive force of one of said sources independently of that of the other.

5. The combination of a plurality of dynamo electric machines, each of said machines having a separately excited field winding, a source of energy for exciting said field windings, and means for independently varying the current in each of said field windings and for reversing the current in one of said windings with reference to another of said windings.

6. The combination of three electromotive force producing windings, each having a coöperating field winding, means mechanically connecting said electromotive force producing windings together, one of said electromotive force producing windings supplying current for energizing the field windings of the other two electromotive force producing windings, and means for varying the current supplied by said field exciting winding for controlling the electromotive force of the other two electromotive force producing windings.

7. The combination of three dynamo electric machines, means for mechanically connecting the armatures together, and means for separately exciting the field winding of one of said machines and for varying the current in said field winding.

8. The combination of three dynamo electric machines, means for mechanically coupling the rotating parts of said machines together, and means for causing one of said machines to supply current to corresponding windings of the other two machines.

9. The combination of a prime mover, a dynamo electric machine having an element driven thereby and having a separately excited field winding, an exciter driven by said prime mover for exciting said field winding, two electric motors having their armature windings supplied with current from said dynamo electric machine, and a single means for connecting said motor windings in series and in parallel and for varying the field strength of the motors.

10. The combination of a vehicle, a prime mover on said vehicle, a dynamo electric machine having an element driven by said prime mover, a second dynamo electric machine having an element also driven by said prime mover, means for connecting a winding of one of said machines to a winding of the other of said machines, a motor having its armature winding supplied with current from one of said machines, and a single means for varying the voltage of said current and for varying the field strength of said motor.

11. The combination of a vehicle, a prime mover on said vehicle, a dynamo electric machine having an element driven by said prime mover, a second dynamo electric machine having an element also driven by said prime mover, two motor windings each adapted to supply propelling energy for the vehicle, and a single means for connecting said motor windings in series and in parallel and for controlling the field strength of the motors.

12. The combination of two dynamo electric machines, each having a field winding, means for independently reversing the current in each of the field windings and for simultaneously reversing the current in both of said field windings and means comprising a prime source of power for driving said machines.

13. The combination of two windings each adapted to supply an electromotive force produced by magnetic induction, a motor winding connected therewith, means for reversing the electromotive force of one of said first named windings relative to that of the other of said first named windings for controlling the motor, and coöperatively related means for controlling the motor.

14. The combination of a plurality of dynamo electric generators acting jointly to supply a circuit, a plurality of motors working on a common load and connected with said circuit, means for simultaneously controlling the voltage of the electric output of the generators, and additional means for simultaneously controlling said motors.

15. The combination of an electrically propelled vehicle, a prime mover on said vehicle, dynamo electric machines driven thereby, electric propelling motors supplied with energy from said machines, and a single means for connecting the armatures of said machines in series and in parallel with reference to each other and for varying the field strength of the motors.

16. The method of controlling the speed and direction of an electric motor, which consists in supplying its armature from two sources of current in series, said sources being normally approximately equal and opposed, and inversely varying the electromotive forces of said two sources of current.

17. The method of controlling the speed of an electric motor, which consists in supplying it from two sources of current in series, and dissimilarly varying the electromotive forces of both of said sources.

18. The method of controlling the direction of rotation of an electric motor, which consists in supplying its armature from two opposing sources of current in series, and varying the relation between the electromotive forces of said sources so that either of them may predominate.

19. The method of reversing an electric motor, which consists in supplying its armature from two assistant sources of current in series, then diminishing, reversing and increasing the electromotive force of one of said sources, and then diminishing, reversing and increasing the electromotive force of the other source.

20. The method of reversing an electric motor, which consists in supplying its armature from two unequal opposing sources of current in series, and then varying the relation between the electromotive forces of said two sources until the inequality is reversed.

21. The method of controlling an electric motor, consisting in rotating a plurality of generator armatures in separate magnetic fields, impressing the algebraic sum of the electromotive forces of said generator armatures on the armature of the motor, and varying all of the magnetic fields so that at times the said algebraic sum is less than one of its components.

22. The method of controlling an electric motor, consisting in rotating a plurality of generator armatures in separate magnetic fields, impressing the algebraic sum of the electromotive forces of said generators on the armature of the motor and inversely varying two of said generator fields.

23. The method of controlling an electric motor, consisting in rotating a plurality of generator armatures in separate magnetic fields, impressing the algebraic sum of the electromotive forces of said generators on the armature of the motor, and differently varying the fields of said generators.

24. The method of controlling an electric motor, consisting in rotating a plurality of generator armatures in separate magnetic fields, impressing the algebraic sum of the electromotive forces of said generator armatures upon the armature of the motor, and varying the said algebraic sum from a maximum in one direction to a maximum in the other direction by successively reversing the magnetic fields of the various generator armatures.

25. The method of operating an electric motor at variable speed and load which consists in supplying mechanical energy, converting it into electrical energy at a plurality of separate electromotive forces, impressing the algebraic sum of said electromotive forces on the armature of the motor, and individually varying said component electromotive forces.

26. A system of motor control, comprising a motor, two sources of current connected in series for supplying the motor armature, and means for varying and reversing the electromotive force of each of said sources of current.

27. A motor control system comprising two dynamo electric generators, a motor whose armature has impressed thereon the algebraic sum of the electromotive forces of said generators, and means for inversely varying said component electromotive forces.

28. A motor control system comprising two dynamo electric generators, a motor the armature of which is supplied by said generators in series, and means for differently varying the field strengths of said generators.

29. A system of motor control, comprising an electric motor, a plurality of sources of current connected in series and supplying the motor armature, and means for successively diminishing to zero and increasing in the reverse direction the electromotive forces of said sources of current.

30. In a system of distribution, a translating device, a plurality of sources of current connected in series for supplying said translating device, and means for successively reversing the electromotive forces of said sources of current.

31. In a system of distribution, a translating device, a plurality of generators connected in series and supplying said translating device, and means for varying the field strengths of said generators so that the generators oppose each other or assist each other in either direction.

32. A system of distribution, comprising a translating device, a plurality of generators connected in series and supplying said translating device, and a unitary means for varying and reversing the fields of all of said generators.

33. In an electrically propelled vehicle, the combination of two electromotive force producing windings mechanically connected together, switching devices for placing said windings in series or in parallel relation with each other, two electric motors supplied with energy from said electromotive force producing windings, and switching devices for placing the motor armatures in series or in parallel relation with each other.

34. In an electrically propelled vehicle, the combination of two electromotive force producing windings mechanically connected together, switching devices for placing said windings in series or in parallel relation with each other, two electric motors having their field windings connected in parallel relative to each other and supplied from a source of practically constant electromotive force, and the armatures of said motors being supplied with energy from said electromotive force producing windings, and switching devices for placing the motor armatures in series or in parallel relation with each other.

35. In an electrically propelled vehicle, the combination of two electromotive force producing windings mechanically connected together, an internal combustion engine for driving said windings, switching devices for placing said windings in series or in parallel relation with each other, two electric motors supplied with energy from said electromotive force producing windings, and switching devices for placing the motor armatures in series or in parallel relation with each other.

36. In an electrically propelled vehicle, the combination of two electromotive force producing windings mechanically connected together, an internal combustion engine for driving said windings, switching devices for placing said windings in series or in parallel relation with each other, two electric motors having their field windings supplied from a source of practically constant electromotive force, and the armatures of said motors being supplied with energy from said electromotive force producing windings, and switching devices for placing the motor armatures in series or in parallel relation with each other.

37. The combination of two electromotive force producing windings mechanically connected together, switching devices for placing said windings in series or in parallel relation with each other, two electric motors supplied with energy from said electromotive force producing windings, switching devices for placing the motor armatures in series or in parallel relation with each other, and means for reversing the direction of current flow in one element of the motors to reverse the direction of rotation.

38. In an electrically propelled vehicle, the combination of two electromotive force producing windings mechanically connected together, switching devices for placing said windings in series or in parallel relation with each other, two electric motors having their field windings separately excited and the armatures of said motors being supplied with energy from said electromotive force producing windings, switching devices for placing the motor armatures in series or in parallel relation with each other, and means for reversing the direction of current flow in the armatures of said motors to reverse the direction of rotation.

39. The combination of a plurality of motor armature windings rigidly connected together mechanically and connected in series electrically, a plurality of generator windings in series with each other and with said motor windings, and means for varying the joint electromotive force of the generator windings for varying the speed of the motor windings.

40. The combination of a plurality of motor armature windings rigidly connected together mechanically and connected in series electrically, a plurality of generator windings in series with each other and with said motor windings, and means for varying the joint electromotive force of the generator windings for varying the speed of the motor windings and for reversing the joint electromotive force of said generator windings for reversing the direction of rotation of the motor windings.

41. A unit or vehicle upon wheels, with a plurality of dynamos, a prime mover or prime movers operatively connected with said dynamos, a plurality of motors operatively connected with said wheels, means whereby said dynamos may be connected in multiple and in series with each other, and means whereby said motors may be coupled in series and in multiple with each other, in such manner that the dynamos may be coupled in multiple with each other to supply current to the motors in series with each other, and that the dynamos may be coupled in series with each other to supply current to the motors in multiple with each other.

In testimony whereof I affix my signature, in presence of two witnesses.

HARRY WARD LEONARD.

Witnesses:
B. E. SMYTHE,
GEO. N. KERR.

Copies of this patent may be obtained for five cents each, by addressing the "Commissioner of Patents. Washington, D. C."